(12) United States Patent
Yang

(10) Patent No.: US 12,006,928 B2
(45) Date of Patent: Jun. 11, 2024

(54) INFLATOR WITH MOTOR FIXING RING

(71) Applicant: DONGGUAN RICHTEK ELECTRONICS CO., LTD., Dongguan (CN)

(72) Inventor: Ken Yang, Dongguan (CN)

(73) Assignee: DONGGUAN RICHTEK ELECTRONICS CO., Dongguan (CN)

( * ) Notice: Subject to any disclaimer, the term of this patent is extended or adjusted under 35 U.S.C. 154(b) by 887 days.

(21) Appl. No.: 15/733,573

(22) PCT Filed: Apr. 17, 2019

(86) PCT No.: PCT/CN2019/083085
§ 371 (c)(1),
(2) Date: Sep. 1, 2020

(87) PCT Pub. No.: WO2020/034654
PCT Pub. Date: Feb. 20, 2020

(65) Prior Publication Data
US 2021/0071652 A1    Mar. 11, 2021

(30) Foreign Application Priority Data
Aug. 16, 2018 (CN) .......................... 201810934323.6

(51) Int. Cl.
*F04B 35/04* (2006.01)
*F04B 39/06* (2006.01)
(Continued)

(52) U.S. Cl.
CPC ............ *F04B 35/04* (2013.01); *F04B 39/066* (2013.01); *F04B 39/121* (2013.01); *F04D 25/06* (2013.01);
(Continued)

(58) Field of Classification Search
CPC ...... F04B 35/04; F04B 39/121; F04B 39/066; F04D 25/06; F04D 25/082;
(Continued)

(56) References Cited

U.S. PATENT DOCUMENTS 2,401,662 A * 6/1946 Prat Divi ................. H02K 5/15
310/216.127
3,235,653 A * 2/1966 Ostrognai ............... F16F 1/376
248/606
(Continued)

FOREIGN PATENT DOCUMENTS

CN       201814349        5/2011
CN       105186787        12/2015
(Continued)

*Primary Examiner* — Christopher S Bobish
(74) *Attorney, Agent, or Firm* — Sinorica International Patent & Trademark

(57) ABSTRACT

An inflator with a motor fixing ring includes a casing, and a core and a motor installed in the casing. The motor is for driving the core to inflate an external object. The inflator further includes a motor fixing ring sheathed on the motor and clamped between the motor and the casing. An air gap is formed between an outer surface of the motor and an inner surface of the casing. During the use of the inflator, the motor fixing ring is sheathed on the motor, and the motor is installed into the casing, so that the motor fixing ring is clamped between the motor and the casing. A cooling fan of the inflator is provided for flowing air along the air gap to dissipate the heat generated by the motor, so as to improve the cooling efficiency of the motor and the performance of the inflator.

4 Claims, 5 Drawing Sheets

(51) Int. Cl.
   *F04B 39/12*    (2006.01)
   *F04D 25/06*    (2006.01)
   *F04D 25/08*    (2006.01)
   *F04D 29/40*    (2006.01)
   *F04D 29/58*    (2006.01)
   *H02K 9/06*     (2006.01)
   *H02K 9/14*     (2006.01)

(52) U.S. Cl.
   CPC ....... *F04D 25/0606* (2013.01); *F04D 25/082* (2013.01); *F04D 29/403* (2013.01); *F04D 29/584* (2013.01); *H02K 9/06* (2013.01); *H02K 9/14* (2013.01)

(58) Field of Classification Search
   CPC .. F04D 25/0606; F04D 29/403; F04D 29/584; H02K 9/06; H02K 9/14
   See application file for complete search history.

(56) References Cited

U.S. PATENT DOCUMENTS

| | | | | |
|---|---|---|---|---|
| 3,536,280 | A * | 10/1970 | Barlow | H02K 5/00 248/676 |
| 5,397,950 | A * | 3/1995 | Norbury, Jr. | H02K 1/187 310/58 |
| 5,786,647 | A * | 7/1998 | Vollmer | F04D 25/08 310/91 |
| 7,001,156 | B2 * | 2/2006 | Chen | F04B 39/066 55/467 |
| 7,118,355 | B2 * | 10/2006 | Lipa, III | F04D 25/0606 417/370 |
| 7,119,469 | B2 * | 10/2006 | Ortt | H02K 7/145 310/43 |
| 7,893,572 | B2 * | 2/2011 | Pettitt | F04D 29/668 310/91 |
| 8,629,583 | B2 * | 1/2014 | Bernhardt | H02K 7/14 310/91 |
| 8,636,479 | B2 * | 1/2014 | Kenyon | F04D 29/403 417/423.5 |
| 10,826,347 | B2 * | 11/2020 | Chou | H02K 5/207 |
| 2009/0208351 | A1 | 8/2009 | Coenraets | |
| 2013/0228316 | A1 * | 9/2013 | Hong | F04B 39/066 165/121 |
| 2016/0265522 | A1 * | 9/2016 | Chou | F04B 39/121 |
| 2019/0024649 | A1 * | 1/2019 | Kuang | F04B 35/01 |
| 2021/0013766 | A1 * | 1/2021 | Chou | H02K 9/06 |
| 2023/0136168 | A1 * | 5/2023 | Castellote | F04D 25/06 417/423.14 |

FOREIGN PATENT DOCUMENTS

| | | |
|---|---|---|
| CN | 205544748 | 8/2016 |
| CN | 108110955 | 6/2018 |
| CN | 109026590 | 12/2018 |
| CN | 208793175 | 4/2019 |
| CN | 208793176 | 4/2019 |

\* cited by examiner

INFLATOR WITH MOTOR FIXING RING

FIELD OF THE INVENTION

The present invention relates to the technical field of inflators, and more particularly to an inflator with a motor fixing ring.

BACKGROUND OF THE INVENTION

Inflator is one of the commonly used devices for inflating various different types of pneumatic tires. Most of the inflators include a casing, a motor and a core. During the use of the inflator, the motor drives the core to inflate the pneumatic tire. However, the heat generated by the operation of the motor cannot be timely dissipated to the outside of the casing due to the unreasonable structural design of the conventional inflator, and thus the motor may be overheated, burned or damaged easily by high temperature.

SUMMARY OF THE INVENTION

In view of the aforementioned drawbacks and deficiencies of the prior art, it is a primary objective of the present invention to provide an inflator with a motor fixing ring. During the use of the inflator, a cooling fan of the inflator is provided for flowing air along an air gap between an outer surface of the motor and an inner surface of a casing to dissipate the heat generated by the motor, so as to improve the cooling efficiency of the motor and the performance of the inflator.

To achieve the aforementioned and other objectives, the present invention discloses an inflator with a motor fixing ring, comprising: a casing, and a core and a motor installed in the casing, wherein the motor is provided for driving the core to inflate an external object, and the inflator further comprises the motor fixing ring sheathed on the motor and clamped between the motor and the casing, and an air gap is formed between an outer surface of the motor and an inner surface of the casing.

Preferably, the motor fixing ring has a ring body and two lugs, and the two lugs are formed and protruded in opposite directions from both opposite sides of the ring body respectively and disposed on the casing, and the ring body is sheathed on the motor, and an air gap is formed between an outer surface of the ring body and an inner surface of the casing Preferably, one of the lugs has a limit bump, and the casing has a limit groove for receiving the limit bump.

Preferably, the motor has a circular blind slot concavely formed on an outer surface of the motor, and the motor fixing ring is received in the circular blind slot.

Preferably, the motor has an anti-rotation notch communicating with the circular blind slot, and the motor fixing ring has an anti-rotation plate extending into the anti-rotation notch.

Preferably, the motor fixing ring is made of soft plastic.

Preferably, the lug has a latching blind slot, and the casing has two latching blocks extending into the latching blind slots of the two lugs respectively.

The present invention has the following advantages. During the use of the inflator, the motor fixing ring is sheathed on the motor, and the motor communicating with the motor fixing ring is installed into the casing, so that the motor fixing ring is clamped between the motor and the casing. A cooling fan of the inflator is provided for flowing air along the air gap between the outer surface of the motor and the inner surface of the casing to dissipate the heat generated by the motor, so as to improve the cooling efficiency of the motor and the performance of the inflator.

DESCRIPTION OF THE PREFERRED EMBODIMENTS

The technical characteristics of the present invention will become apparent with the detailed description of preferred embodiments accompanied with the illustration of related drawings. It is intended that the embodiments and drawings disclosed herein are to be considered illustrative rather than restrictive.

Figure 1:
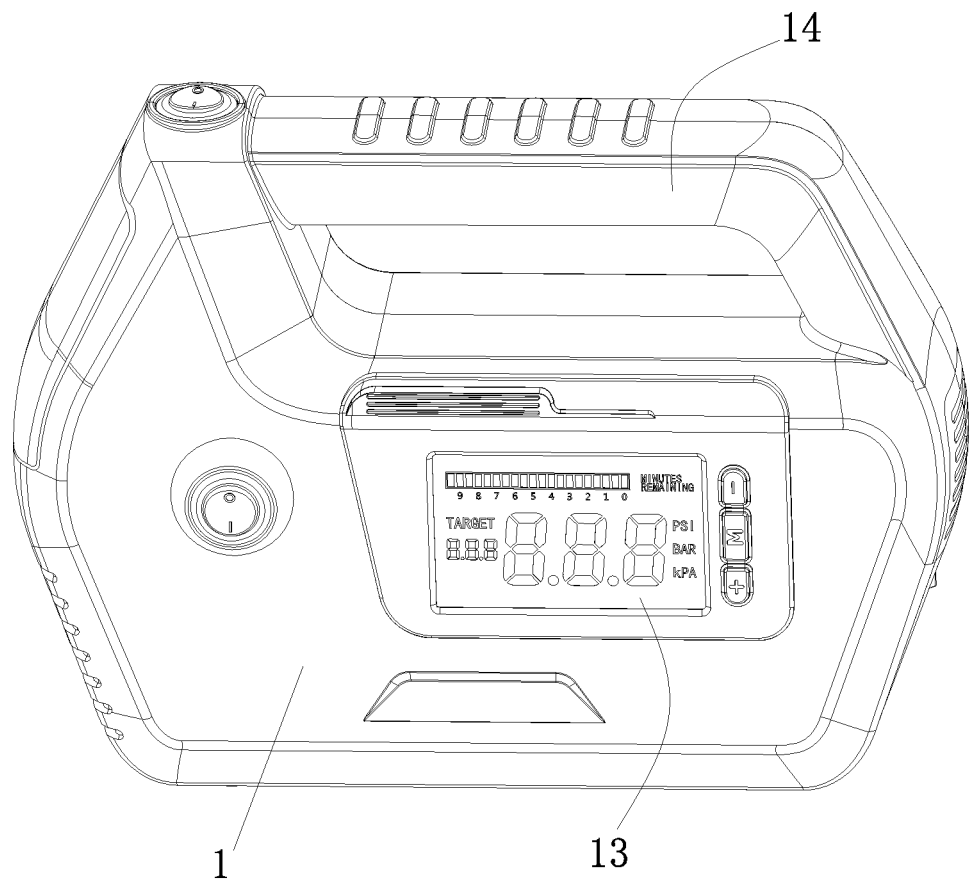
FIG. 1 is a perspective view of the present invention.
Figure 2:
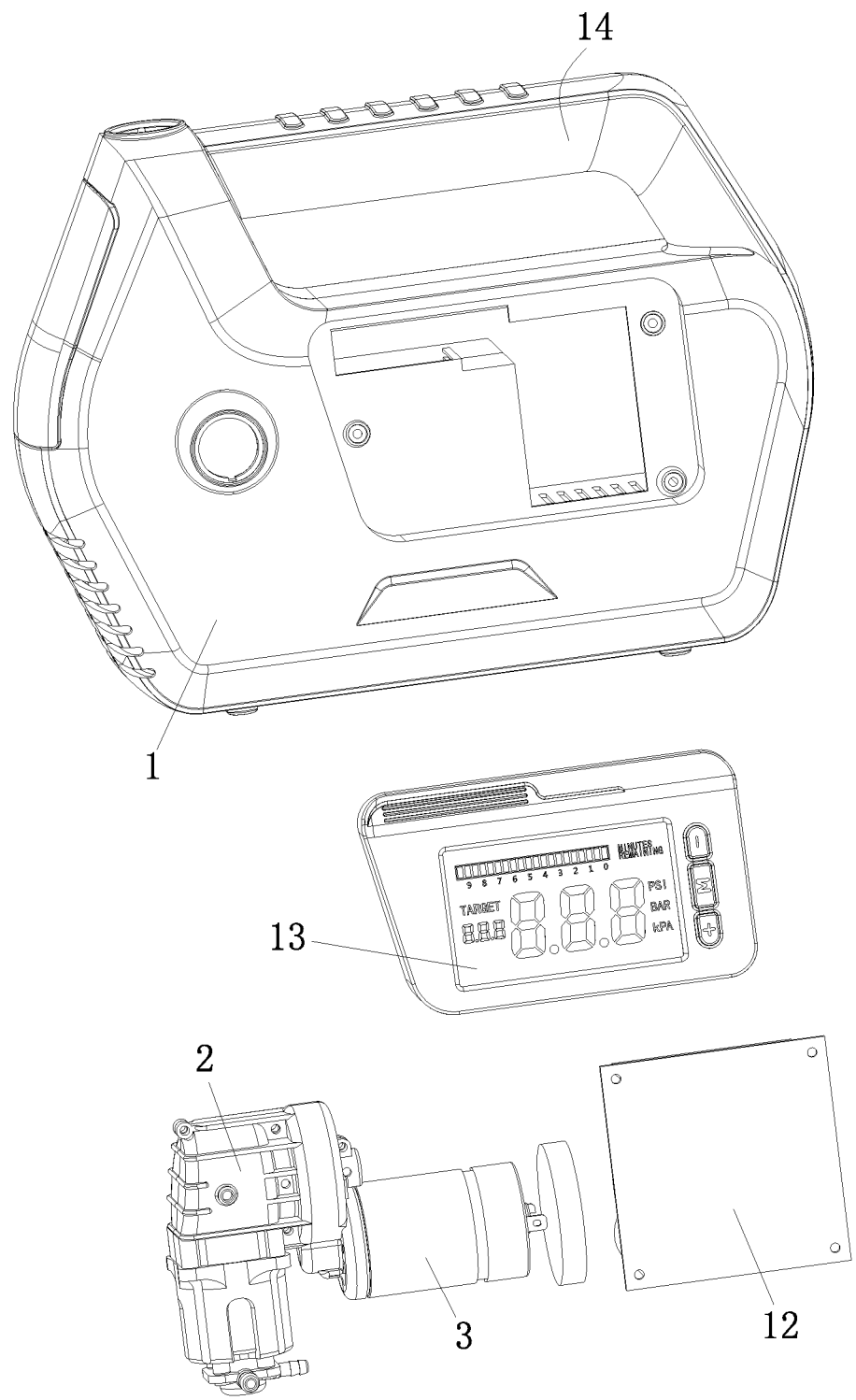
FIG. 2 is an exploded view of the present invention.
Figure 3:
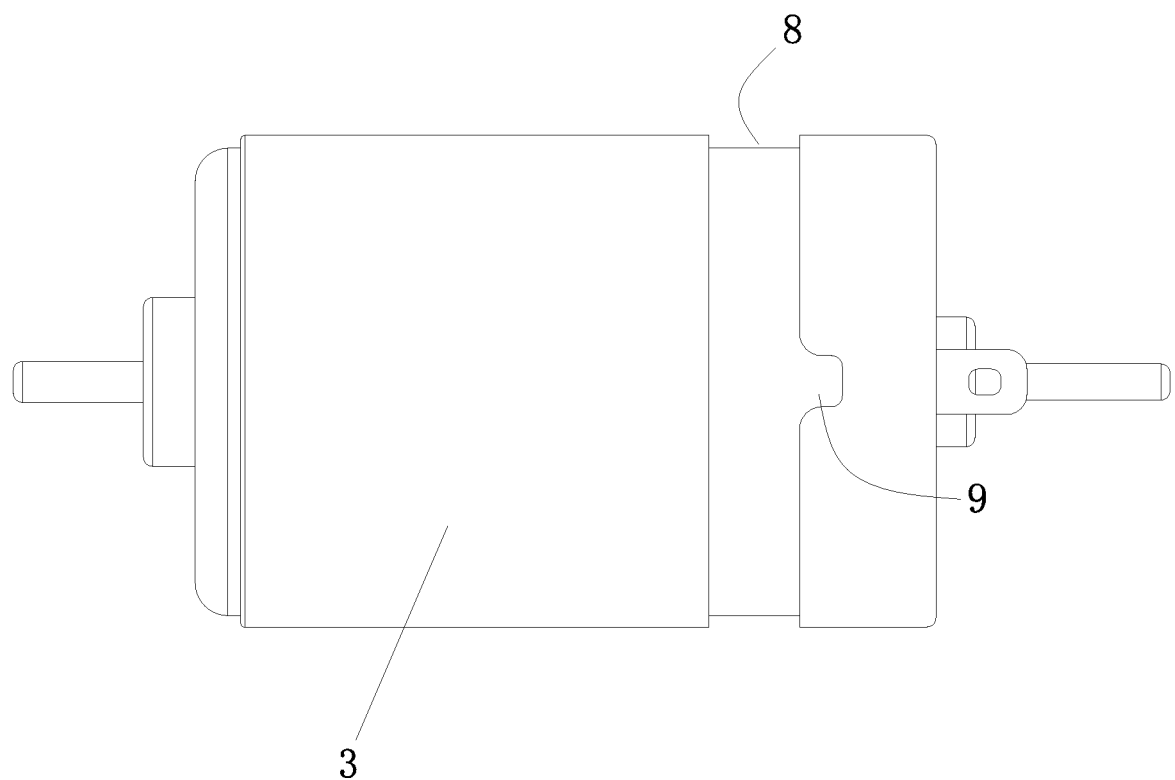
FIG. 3 is a main view of a motor of the present invention.
Figure 4:
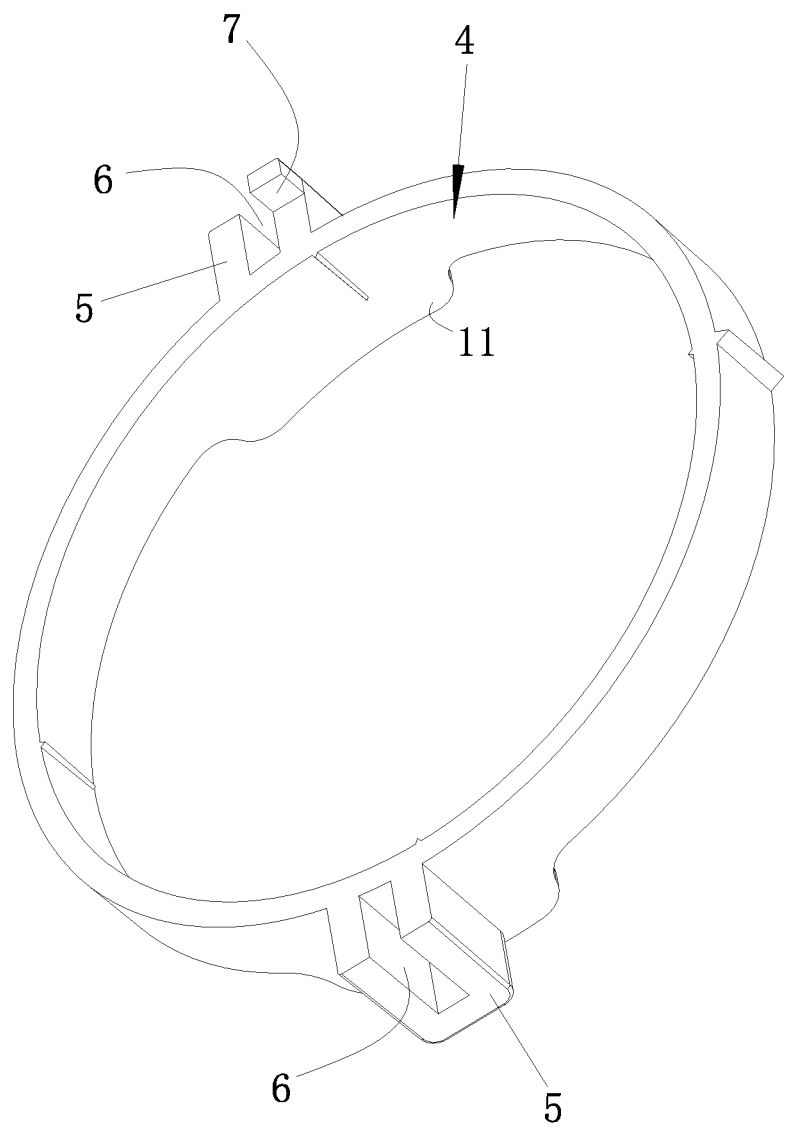
FIG. 4 is a perspective view of a motor fixing ring of the present invention.
Figure 5:
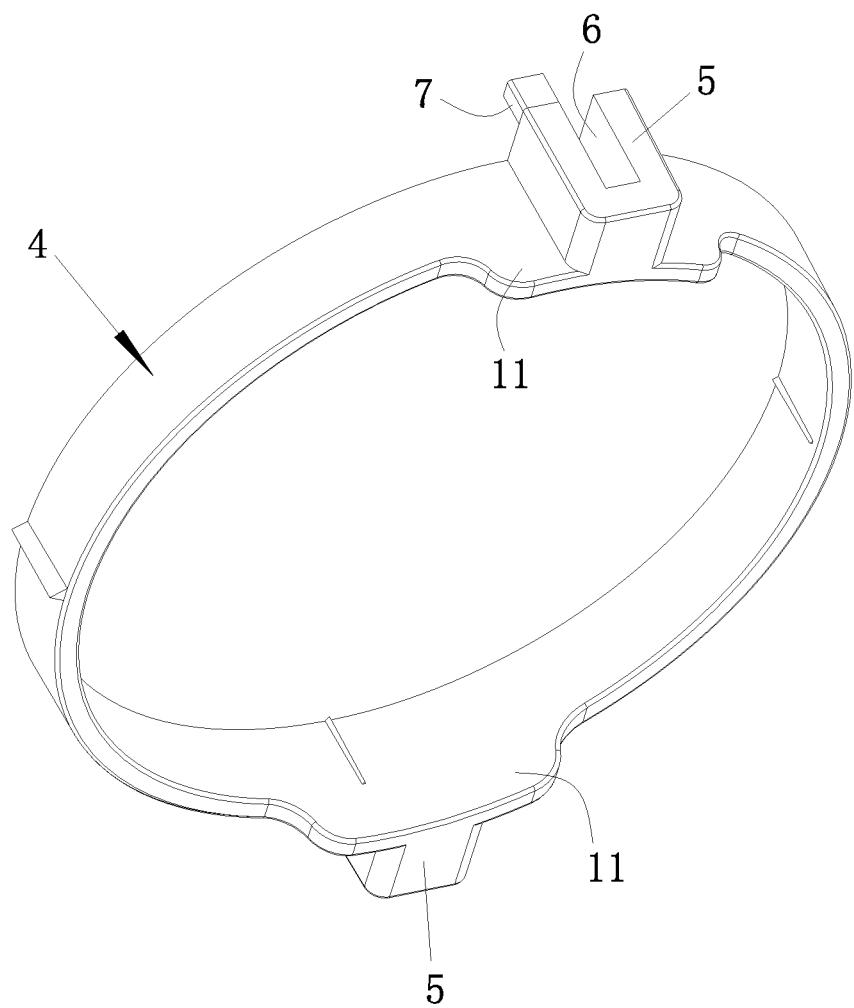
FIG. 5 is another perspective view of a motor fixing ring of the present invention.

With reference to FIGS. 1 to 5 for an inflator with a motor fixing ring of the present invention, the inflator comprises a casing 1, and a core 2 and a motor 3 installed in the casing 1, and the motor 3 is provided for driving the core 2 to inflate an external object (such as a pneumatic tire, balloon, etc.) and the inflator further comprises a motor fixing ring 4 in a substantially circular shape and the motor fixing ring 4 is sheathed on the motor 3 and clamped between the motor 3 and the casing 1, and an air gap is formed between an outer surface of the motor 3 and an inner surface of the casing 1.

In the manufacturing process of the inflator, the motor fixing ring 4 is sheathed on the motor 3, and then the motor 3 together with the motor fixing ring 4 are installed into the casing 1, so that the motor fixing ring 4 is clamped between the motor 3 and the casing 1. During the use of the inflator, a cooling fan of the inflator is provided for flowing air along the air gap between the outer surface of the motor 3 and the inner surface of the casing 1 to dissipate the heat generated by the motor 3, so as to improve the cooling efficiency of the motor 3 and the performance of the inflator.

The motor fixing ring 4 has a ring body (not labeled in the figure) and two lugs 5, and the two lugs 5 are formed and protruded in opposite directions from two opposites sides of the ring body respectively, and the ring body is sheathed on the motor 3, and an air gap is formed between the outer surface of the ring body and the inner surface of the casing 1. The two lugs 5 are fixed onto the casing 1. During the use of the inflator, the cooling fan drives air to flow along the air gap between the motor 3 and the casing 1 and the air gap between the ring body and the casing 1, so as to further improve the cooling effect of the motor.

The motor fixing ring 4 is an integral structure. In other words, the ring body and the two lugs 5 are integrally formed as a whole, and both of the two lugs 5 have a latching blind slot 6, and the motor fixing ring 4 is made of plastic, and the latching blind slot 6 is provided for reducing the thickness of the lug 5. Compared with the conventional lug 5 with a solid configuration, the arrangement of this invention can avoid a thick lug 5 that may cause defectives due to plastic shrinkage. Preferably, the casing 1 has two latching blocks (not shown in the figure) extending into the two latching blind slots 6 respectively. Now, the latching block of the casing 1 extends into the latching blind slot 6, and the sidewall of the latching blind slot 6 blocks and stops the latching block to achieve the effect of limiting the motor fixing ring 4 by using the casing 1. After the inflator is assembled, the invention can effectively prevent the motor fixing ring 4 from moving with respect to the casing 1.

In this embodiment, one of the lugs 5 has a limit bump 7, and the casing 1 has a limit groove (not shown in the figure) for receiving the limit bump 7. During the installation process of the motor fixing ring 4 and the casing 1, the limit bump 7 is aligned precisely with the limit groove first, and then the casing 1 and the motor fixing ring 4 are assembled, so that the limit bump 7 can be plugged into the limit groove to achieve a precise alignment of the motor fixing ring 4 with the casing 1, so as to prevent a poor assembly of the inflator due to a wrong installation position of the motor fixing ring 4.

The motor 3 has a circular blind slot 8 concavely formed on an outer surface of the motor 3, and a ring body of the motor fixing ring 4 is received into the circular blind slot 8, and the sidewall of the circular blind slot 8 is provided for blocking and stopping the ring body of the motor fixing ring 4 to prevent the motor fixing ring 4 from moving with respect to the motor 3, and the ring body of the motor fixing ring 4 is not protruded from the outer surface of the motor 3. In other words, the ring body of the motor fixing ring 4 is not completely plugged into the circular blind slot 8, so that when the cooling fan drives air to flow along the air gap between the motor 3 and the casing 1, the ring body will not hinder the air flowing in the air gap, and this invention ensures that the air flowing in the air gap can quickly dissipate the heat generated by the motor to the outside of the casing 1.

The motor 3 has an anti-rotation notch 9 communicating with the circular blind slot 8 and concavely formed on the sidewall of the circular blind slot 8, and the motor fixing ring 4 has an anti-rotation plate 11, so that after the motor fixing ring 4 is sheathed on the motor 3, the anti-rotation plate 11 extends into the anti-rotation notch 9, and the sidewall of the anti-rotation notch 9 abuts the anti-rotation plate 11 to prevent the motor fixing ring 4 from rotating with respect to the motor 3. In this embodiment, the lug 5 is coupled to the motor fixing ring 4 and the anti-rotation plate 11 at the same time to extend the length of the lug 5 and assist extending the length of the latching blind slot 6, so as to improve the engagement effect between the latching block and the lug 5.

In this embodiment, the motor fixing ring 4 is made of soft plastic such as silicone, because the soft plastic can absorb the impact on the casing while the motor 3 is running.

The casing 1 further has a control module 12 installed therein, and a display screen installed thereon for displaying the operating parameters of the inflator and the motor 3 and the display screen 13 are electrically coupled to the control module 12. The display screen 13 has an inflation progress indicator formed by a plurality of display bars which are parallelly separated from each other, and the inflation progress indicator is used for the countdown of the time required for filling up the air into the external object, and the quantity of the display bars of the control module 12 is determined by the difference between the target inflation pressure and the actual pressure divided by the amount of airflow of the inflator.

The casing 1 has a grip handle 14 with both ends coupled to the casing 1, and a yield hole (not labeled in the figure) is formed between the grip handle 14 and the casing 1. In actual use, a user inserts his/her hand into the yield hole and then holds the grip handle 14 by the hand, so that the casing 1 can move the inflator conveniently to improve customer experience. Preferably, the grip handle 14 further has a frictional projection (not shown in the figure) formed thereon and provided for pressing and touching the user's hand.

While the invention has been described by means of specific embodiments, numerous modifications and variations could be made thereto by those skilled in the art without departing from the scope and spirit of the invention as set forth in the claims.

What is claimed is:

1. An inflator with a motor fixing ring, comprising: a casing, and a core and a motor installed in the casing, and the motor being provided for driving the core to inflate an external object, the motor fixing ring sheathed on the motor and clamped between the motor and the casing, and an air gap is formed between an outer surface of the motor and an inner surface of the casing; and the motor has a circular blind slot concavely formed on an outer surface of the motor, and the motor fixing ring is received in the circular blind slot; and the motor has an anti-rotation notch communicating with the circular blind slot, and the motor fixing ring has an anti-rotation plate extending into the anti-rotation notch.

2. The inflator with a motor fixing ring as claimed in claim 1, wherein the motor fixing ring has a ring body and two lugs, and the two lugs are formed and protruded in opposite directions from both opposite sides of the ring body respectively and disposed on the casing, and the ring body is sheathed on the motor, and an air gap is formed between an outer surface of the ring body and an inner surface of the casing.

3. The inflator with a motor fixing ring as claimed in claim 1, wherein the motor fixing ring is made of soft plastic.

4. The inflator with a motor fixing ring as claimed in claim 2, wherein each of the two lugs has a latching blind slot, and the casing has two latching blocks extending into the latching blind slots of the two lugs respectively.

\* \* \* \* \*